ary Examiner—Richard Lorence

United States Patent [19]

Martinelli et al.

[11] Patent Number: 5,167,588
[45] Date of Patent: Dec. 1, 1992

[54] HYDROSTATIC TWO-WAY-VARIABLE-SPEED DRIVE

[75] Inventors: Paolo Martinelli, Via Crespellani; Ferdinando Cassese, Stradello del Luzzo, both of Italy

[73] Assignee: Ferrari Engineering S.p.A., Modena, Italy

[21] Appl. No.: 757,931

[22] Filed: Sep. 12, 1991

[30] Foreign Application Priority Data

Jul. 15, 1991 [IT] Italy .............................. 000554 A/91

[51] Int. Cl.⁵ ............................................. F16D 39/00
[52] U.S. Cl. ........................................ 475/78; 60/490; 91/497; 92/12.1
[58] Field of Search ............. 60/490; 91/497; 92/12.1; 475/72, 78, 79, 80, 81, 83

[56] References Cited

U.S. PATENT DOCUMENTS

| | | | |
|---|---|---|---|
| 3,084,562 | 4/1963 | Fitzpatrick | 91/497 X |
| 3,107,622 | 10/1963 | Soden | 91/497 X |
| 3,408,948 | 11/1968 | Boyd | 91/497 |
| 4,747,269 | 5/1988 | David | 60/490 |
| 4,914,914 | 4/1990 | Inoue | 91/497 X |

FOREIGN PATENT DOCUMENTS 290406 8/1953 Switzerland ..................... 475/72

Primary Examiner—Richard Lorence
Assistant Examiner—William O. Trousdell
Attorney, Agent, or Firm—Oblon, Spivak, McClelland, Maier & Neustadt

[57] ABSTRACT

A drive comprising a first group of cylinders of a radial hydraulic pump, rotating in relation to the drive frame about a first axis, and torsionally integral with the input shaft of the drive and with a housing inside which the first group of cylinders rotates; a second group of cylinders of a radial hydraulic motor, rotating in relation to the frame about a second axis; an output shaft, the axis of which is located between the aforementioned axes, and which is integral with a gear meshing with a gear integral with the housing in which the first group of cylinders rotates, and with another gear integral with the second group of cylinders; a mechanism for varying displacement of the first and second group of cylinders; and a distributing mechanism for alternately connecting the cylinders in the first group with those of the second group.

11 Claims, 7 Drawing Sheets

HYDROSTATIC TWO-WAY-VARIABLE-SPEED DRIVE

BACKGROUND OF THE INVENTION

The present invention relates to a hydrostatic two-way-variable-speed drive, particularly for motor vehicles.

Hydrostatic drives are known substantially comprising a hydraulic pump powered by a drive shaft, e.g. of a vehicle internal combustion engine; and a hydraulic motor connected mechanically to the vehicle wheel drive, and hydraulically to the aforementioned pump by which it is supplied with and powered by pressurized oil.

Drives of the aforementioned type are provided with means for continuously varying displacement of the pump and motor, for supplying the motor with predetermined quantities of pressurized fluid. Means are also provided between the pump and motor, for alternately connecting the pump cylinders with those of the motor.

Drives of the type briefly described above present a number of drawbacks.

Firstly, the speed range of the shaft controlled by the hydraulic motor is fairly narrow. On known drives of the aforementioned type, in fact, the gear ratio is normally varied by varying displacement of the pump or motor, so that maximum speed corresponds with maximum displacement of the pump or minimum displacement of the motor.

Secondly, overall efficiency of the drive is fairly poor, due to hydraulic pressure losses, particularly under certain operating conditions of the drive.

Thirdly, drives involving the connection, as described above, of a hydraulic pump and motor are bulky, particularly in the direction of the pump axes, thus making them unsuitable for use on vehicles with a fairly small engine-transmission compartment.

Finally, drives of the aforementioned type are heavy and extremely noisy.

SUMMARY OF THE INVENTION

It is an object of the present invention to provide a hydrostatic drive designed to overcome the aforementioned drawbacks, i.e. which provides for a wide range of speeds, as required by an automobile; provides for a high degree of efficiency and reliability; and is compact, particularly axially, lightweight and silent-operating.

According to the present invention, there is provided a hydrostatic, two-way-variable-speed drive, characterised by the fact that is comprises:

a first group of cylinders of a radial hydraulic pump, rotating about a first axis in relation to the drive frame; each said cylinder comprising at least a hollow body defining a radial cavity open on the radially-outermost side of said body, and a piston moving axially inside said cavity; said first group of cylinders being torsionally integral with the input shaft of the drive;

at least one annular element arranged peripherally about the cylinders in said first group, and having a substantially cylindrical inner surface cooperating with the radially-outermost end of said pistons in said first group of cylinders, for controlling reciprocating movement of said pistons in relation to said hollow bodies as said first group of cylinders rotates in relation to said annular element; said annular element being secured in radially-adjustable manner to a first housing rotating in relation to said input shaft;

an adjusting device for varying the radial position of said annular element in relation to said housing, for varying the eccentricity of said inner surface of said annular element in relation to said first axis of said first group of cylinders;

a second group of cylinders of a radial hydraulic motor, rotating about a second axis in relation to said frame; each said cylinder comprising at least a hollow body defining a radial cavity open on the radially-innermost side of said body, and a piston moving axially inside said cavity;

at least a cam located in a radially-inner position in relation to the cylinders in said second group, and having an outer surface cooperating with the radially-innermost ends of said pistons in said second group of cylinders, for enabling reciprocating movement of said pistons in relation to said hollow bodies when said cylinders in said second group are supplied with pressurized oil by said first group of cylinders; said cam being supported on said frame;

adjusting means for varying the radial position of said cam in relation to said frame, for varying the eccentricity of said cam in relation to said second axis of said second group of cylinders;

an output shaft of the drive, rotating in relation to said frame about a third axis located between said first axis of said first group of cylinders and said second axis of said second group of cylinders; said output shaft being integral with a first gear meshing with a second gear integral with said second group of cylinders and with a third gear integral with said first housing, so that rotation of said first housing about said first axis rotates said output shaft and said second group of cylinders about said second axis; and hydraulic fluid distributing means for alternately connecting said cylinders in said first group with said cylinders in said second group.

BRIEF DESCRIPTION OF THE DRAWINGS

The drive according to the present invention will be described, by way of example, with reference to the accompanying drawings, in which.

DESCRIPTION OF THE PREFERRED EMBODIMENT

Figure 1:
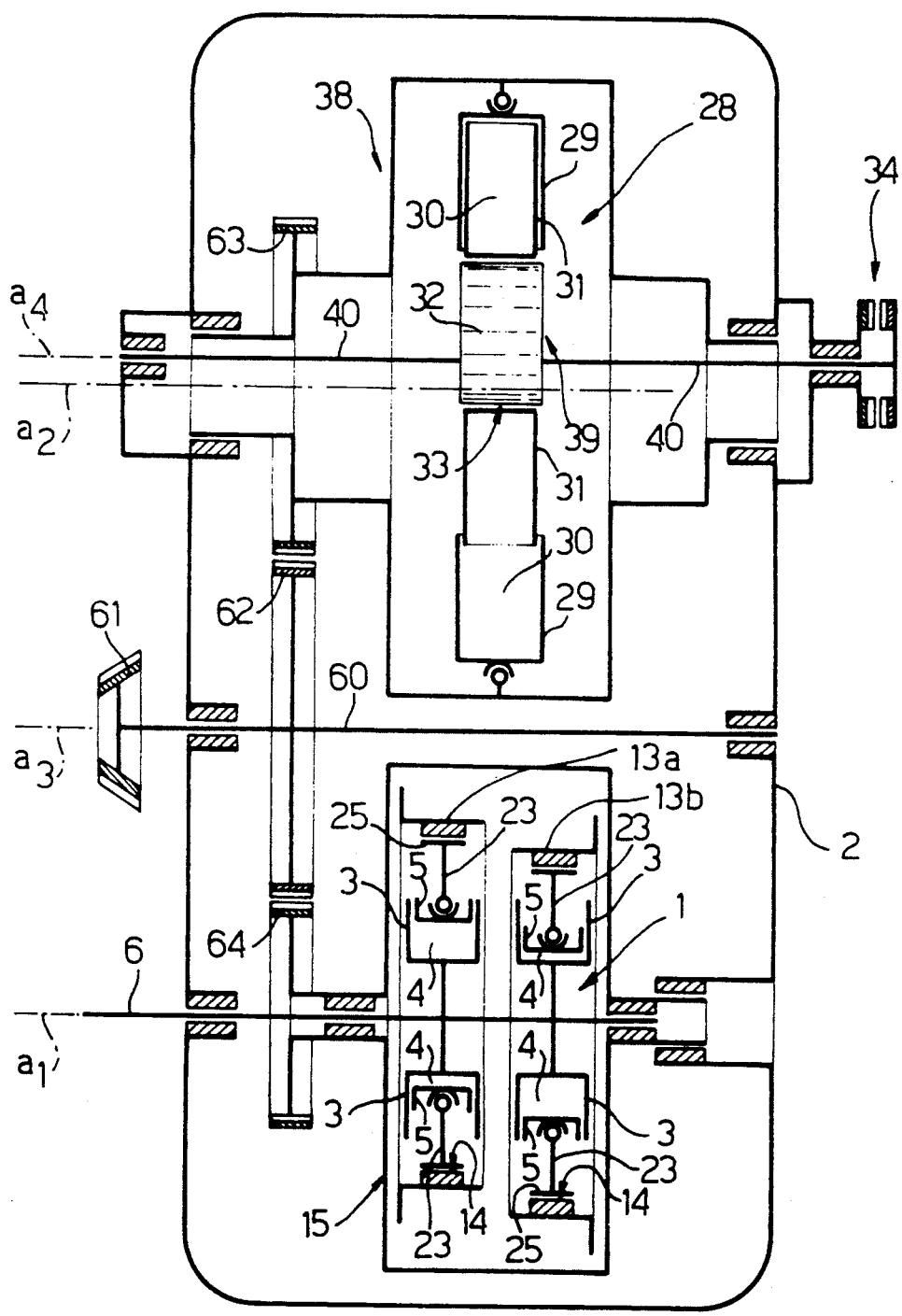
FIG. 1 shows a diagram of the drive according to the present invention.
Figure 2:
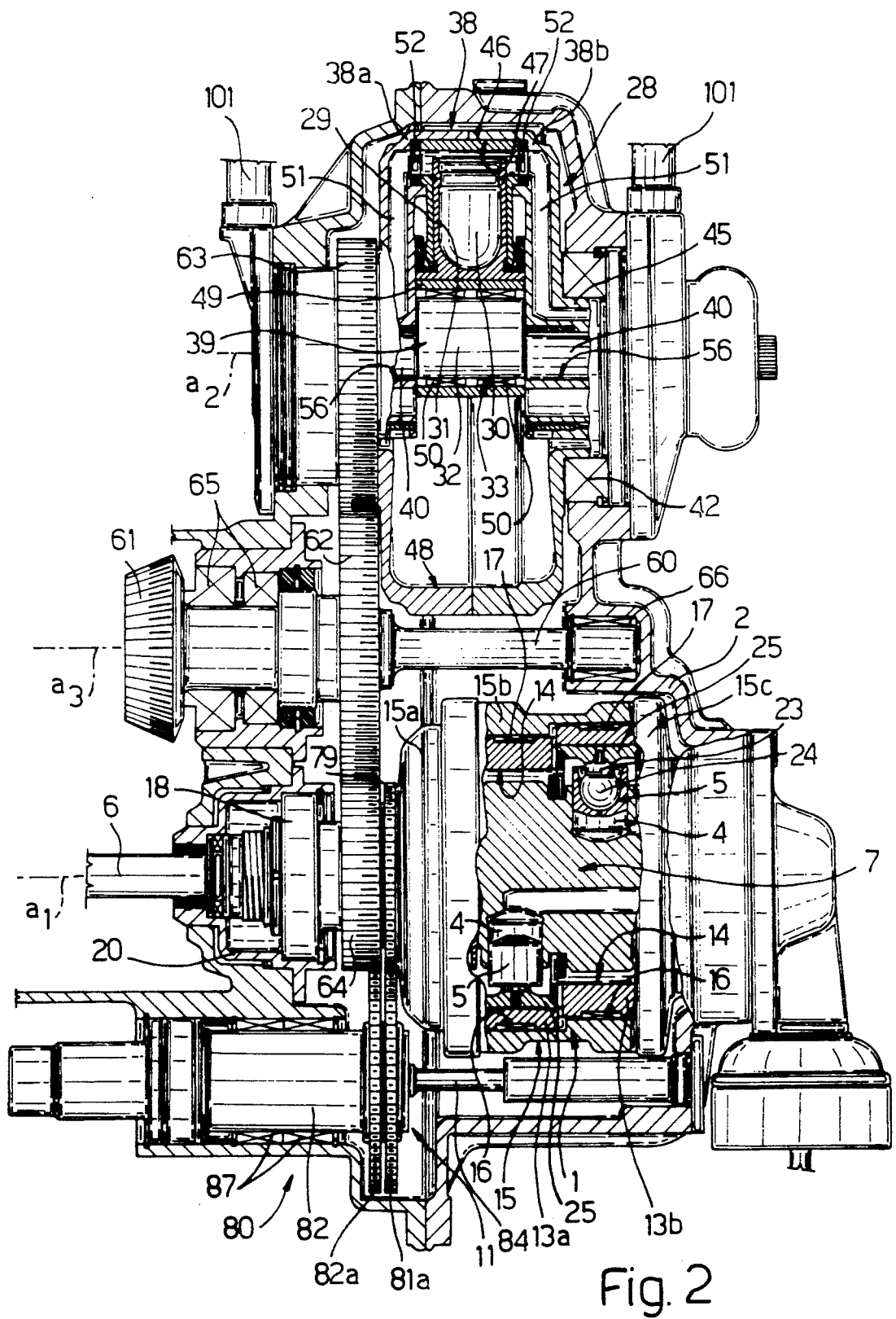
FIG. 2 shows a partially-sectioned side view of the drive according to the present invention.

As shown in the FIG. 1 diagram, the drive according to the present invention comprises a first group of cylinders 1 forming part of a radial hydraulic pump and rotating in relation to frame 2 of the drive about a first axis $a_1$. Each of said cylinders comprises at least a hollow body 3 defining a radial cavity 4 open on the radially-outermost side of body 3, and a piston 5 moving axially inside cavity 4. Cylinder group 1 is torsionally integral with the input shaft 6 of the drive.

Figure 4:
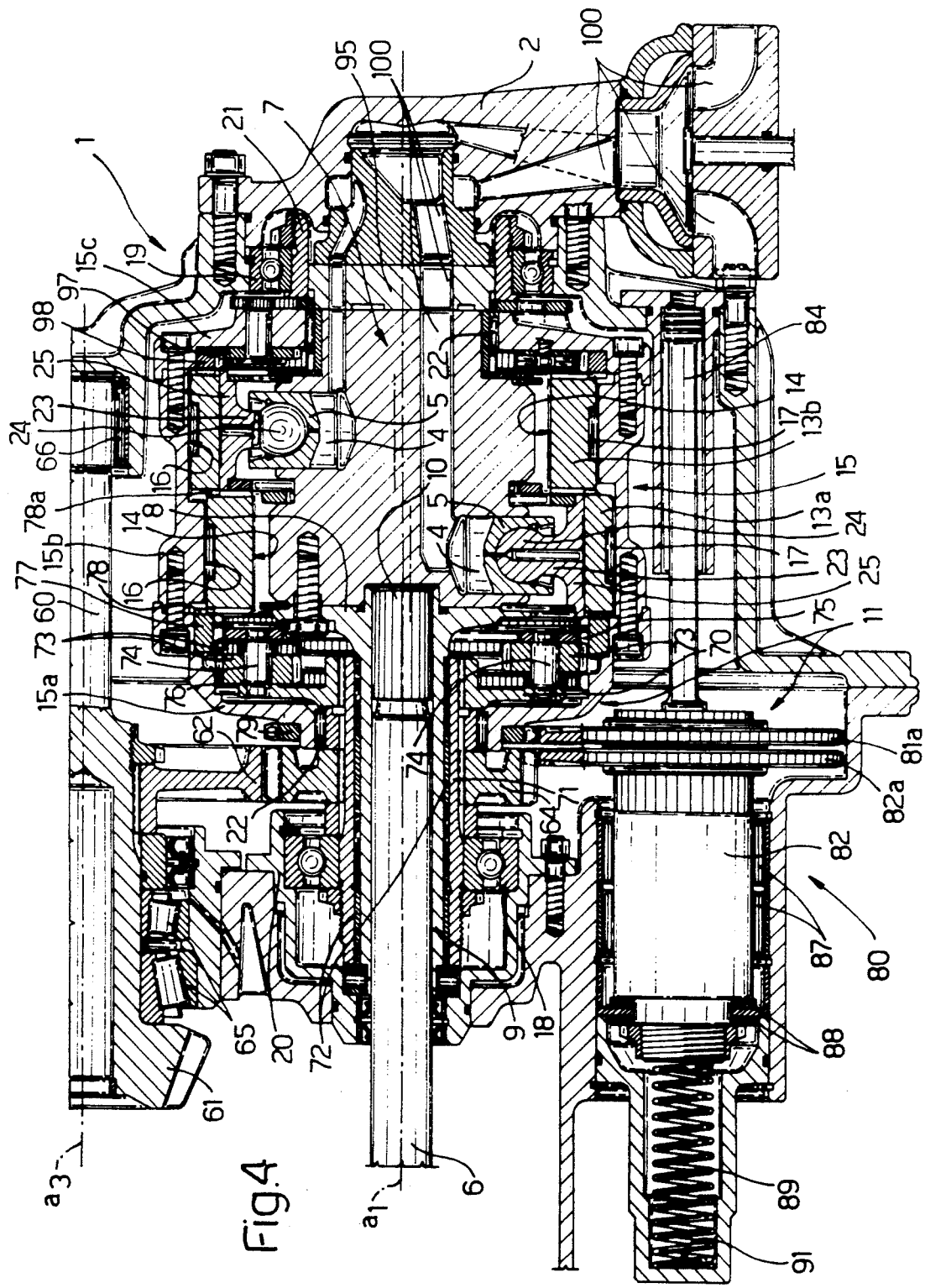
FIG. 4 shows an axial section of part of the drive comprising the first group of cylinders of the radial hydraulic pump.

As shown in FIG. 4, cylinder group 1 may consist of a substantially cylindrical block 7 in which radial cavities 4 are formed. The end surface of block 7 is fitted with a flange 8 having a sleeve 9 in which input shaft 6 is connected by means of a splined coupling 10. Cylinder group 1 may comprise one set of cylinders in the same plane perpendicular to the axis of input shaft 6, or a number of sets, e.g. two, as in the example shown, the axes of which are arranged in parallel planes.

The drive comprises two annular elements 13a, 13b (FIGS. 1 and 4), each fitted peripherally about the cylinders in group 1 and having a substantially cylindrical inner surface 14 cooperating with the radially-outermost ends of pistons 5 for controlling reciprocating movement of pistons 5 in relation to hollow bodies 3 as cylinder group 1 rotates in relation to annular elements 13a, 13b. As shown schematically in FIG. 1, each annular element 13a, 13b is secured in adjustable manner to a housing 15 rotating in relation to input shaft 6. An adjusting device 11 (shown in FIG. 5 and described in detail later on) is also provided for varying the radial position of each annular element 13a, 13b in relation to housing 15, for varying the eccentricity of inner surface 14 of each annular element 13a, 13b in relation to axis $a_1$ of cylinder group 1.

In the embodiment shown in the accompanying drawings, each annular element 13a, 13b is ring-shaped (FIG. 4) and rotates substantially on a cylindrical surface 16 of housing 15. Between surface 16 and the outer surface of each ring, there is inserted a ring of rollers 17. As shown in FIG. 4, housing 15 may conveniently consist of a number of separate parts 15a, 15b, 15c screwed together. The first group of cylinders 1 is supported in relation to frame 2 by means of a pair of ball bearings 18 and 19, the first of which is housed inside a bush 20 integral with housing 15, and the second of which is housed in a seat on frame 2 and supports a ring 21 inside which the end of block 7 is fitted. Each piston 5 is fitted, by means of a spherical joint 24, with a rod 23, the radially-outer end of which presents a shoe 25 mating with cylindrical surface 14 of annular elements 13a, 13b.

As shown in FIG. 1, the drive also comprises a second group of cylinders 28 of a radial hydraulic motor, each cylinder comprising a hollow body 29 defining a radial cavity 30 open on the radially-innermost side of body 29, and a piston 31 moving axially inside cavity 30. In a radially-inner position in relation to the cylinders in group 28, provision is made for a cam 32 having an outer surface 33 cooperating with the radially-innermost ends of pistons 31, for enabling reciprocating movement of pistons 31 in relation to hollow bodies 29 when the cylinders in second group 28 are fed with pressurized oil by said first group of cylinders 1.

As shown in FIG. 1, cam 32 is supported on frame 2, and adjusting means, indicated as a whole by 34 in FIG. 1, are provided for varying the radial position of cam 32 in relation to frame 2, for varying the eccentricity of cam 32 in relation to axis $a_2$ of said second group of cylinders 28.

The cylinders in group 28 are supported on a second housing 38 (FIG. 1) rotating on frame 2 about axis $a_2$, while cam 32 forms part of a crank 39 having two end pins 40 between which cam 32 is fitted. Pins 40 rotate in relation to housing 38 about a further axis $a_3$ offset in relation to axis $a_2$, as shown in FIG. 1.

The angular position of crank 39 may be adjusted and maintained in relation to frame 2 by adjusting means 34. The embodiment shown presents substantially the same components described with reference to FIG. 1. In particular, housing 38 consists of two separate elements 38a, 38b (FIG. 6), and is supported in relation to frame 2 by a ring of rollers 41 between two sleeves 43 and 44 respectively integral with housing 38 and frame 2, and by a bearing 42 between end portion 45 and a seat formed in frame 2.

The bottom wall of each hollow body 29 of each cylinder in group 28 (FIG. 3) presents a cylindrical surface 46 having its axis substantially parallel to axes $a_2$ and $a_3$, and resting in a seat 47 formed on inner surface 48 of housing 38, for enabling each hollow body 29 to oscillate about an axis defined by the above two surfaces.

The end of each piston 31 facing crank 39 also presents a cylindrical surface portion resting on a bush 49 rotating on cam 32 via the interposition of a ring of rolling bodies 50.

Figure 3:
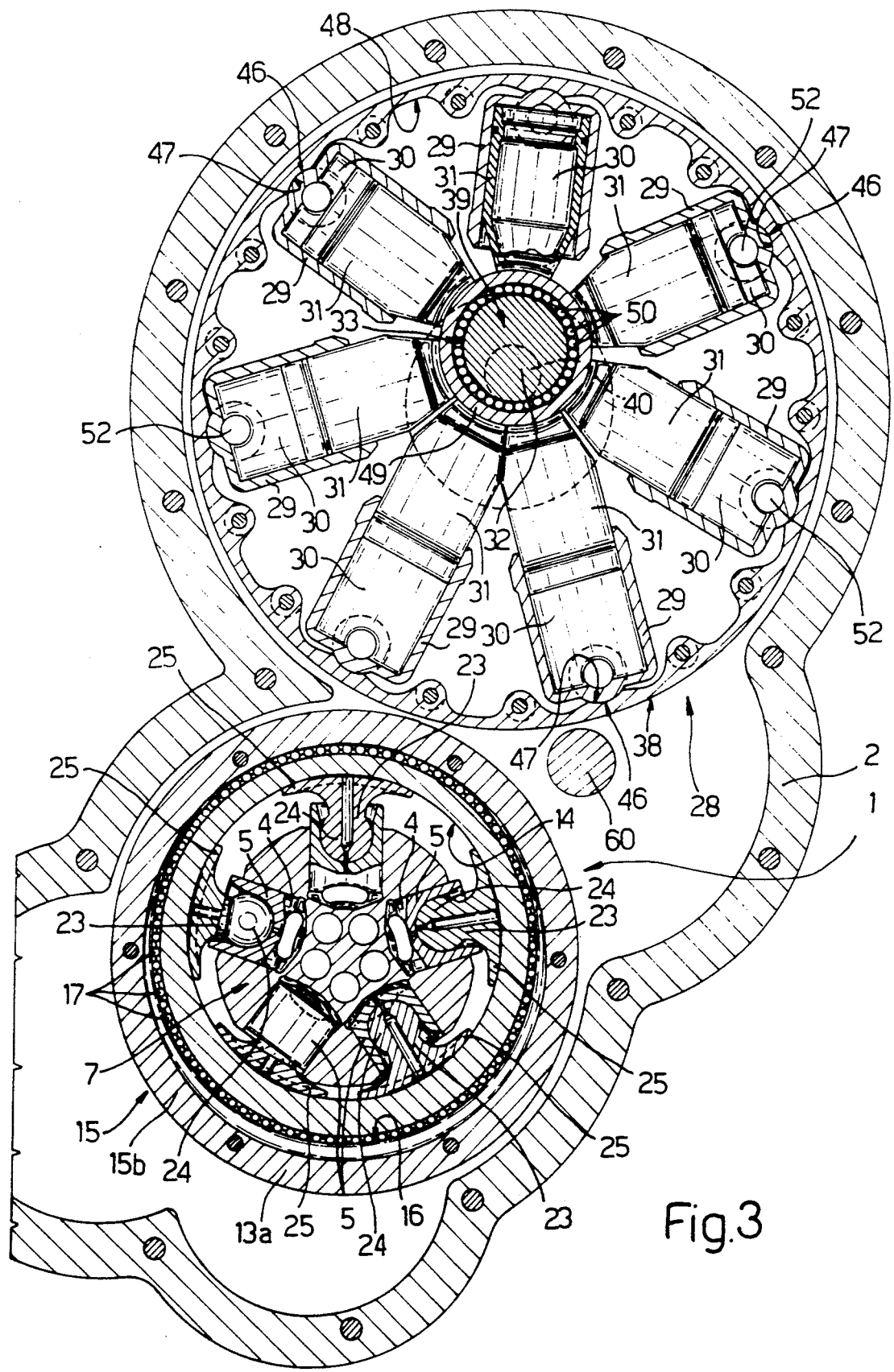
FIG. 3 shows a vertical section of the drive perpendicular to its longitudinal axis.
Figure 6:
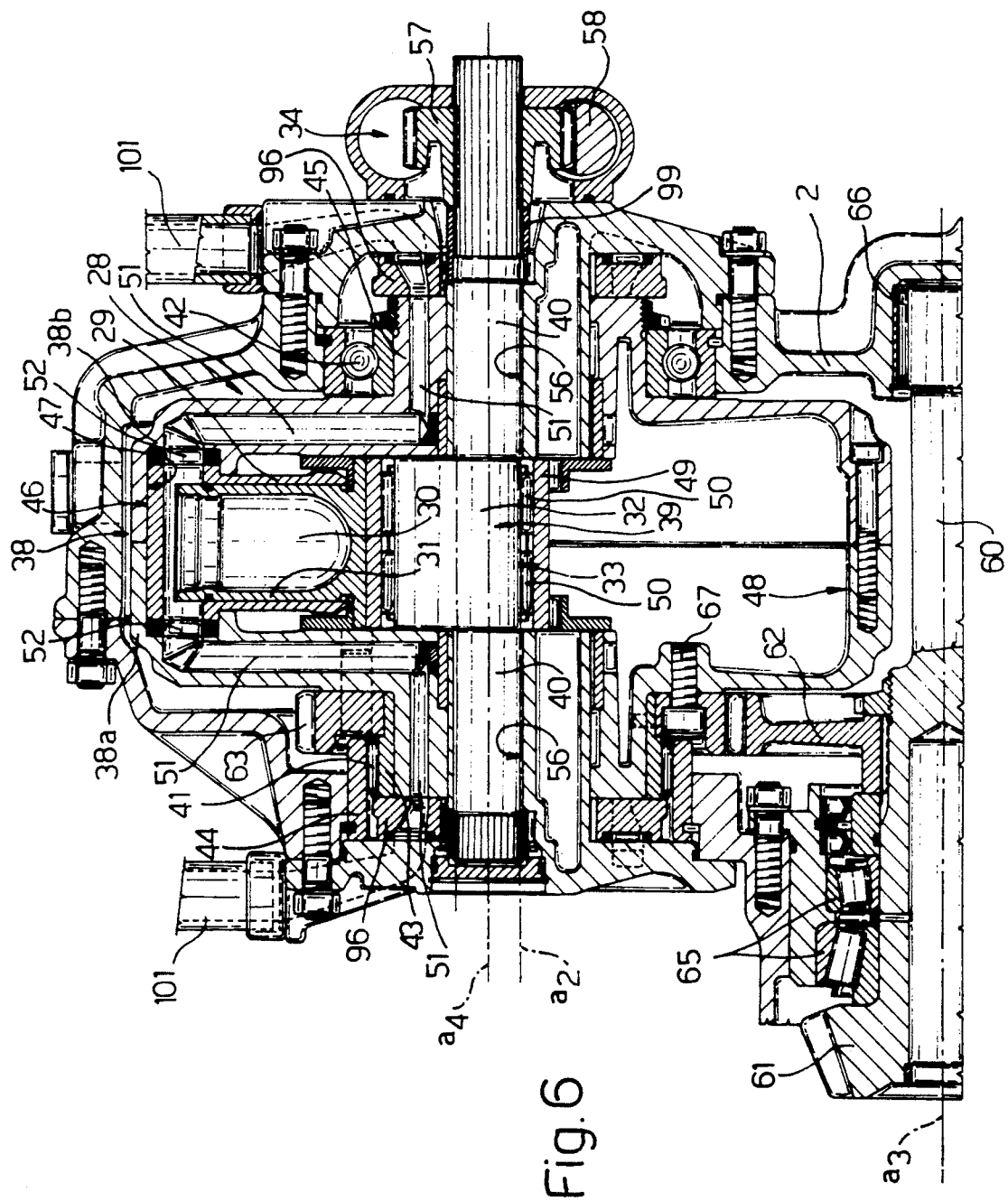
FIG. 6 shows an axial section of another part of the drive illustrating the cylinders of the radial hydraulic motor.

Inside the walls of housing 38, ducts 51 (FIG. 6) are formed for feeding pressurized fluid into each hollow body 29, as described later on. As shown in FIGS. 3 and 6, ducts 51 come out inside body 29 through axial holes 52.

The two end pins 40 of crank 39 (FIG. 6) rotate on surfaces 56 formed in frame 2, and one of pins 40 is fitted with a sprocket 57 (FIG. 6) meshing with a rack 58. Together with an actuator (not shown) for controlling longitudinal movement of rack 58, sprocket 57 and rack 58 constitute said means 34 (FIG. 1) for adjusting the angular position of crank 39.

As shown in the overall diagram in FIG. 1, the drive also comprises an output shaft 60 rotating in relation to frame 2 about a further axis $a_3$ between axes $a_1$ and $a_2$. Output shaft 60 presents, for example, a bevel gear 61 for transmitting motion to the device (normally the differential) controlled by the drive, and is integral with a gear 62 meshing with a gear 63 integral with housing 38 of second cylinder group 28, and with a further gear 64 integral with housing 15 of first cylinder group 1, so that rotation of housing 15 about axis $a_1$ rotates output shaft 60 and, simultaneously, housing 38 about axis $a_2$.

In the embodiment shown, shaft 60 (FIG. 6) is supported on frame 2 by a pair of taper roller bearings 65 at one end, and a ring of rollers 66 at the other. Gear 63 us secured to housing 38, between this and rollers 41, by means of screws 67. Gear 64 (FIGS. 1 and 4) is secured indirectly to housing 15 of group 1 by members described hereinafter and forming part of said device 11 for adjusting the radial position of annular elements 13a, 13b in relation to the housing.

As shown in FIG. 4, adjusting device 11 substantially comprises a disk 70 inside housing 15, which disk 70 is integral with a hollow shaft 71 coaxial with input shaft 6 and rotating on sleeve 9 integral with block 7 of cylinder group 1. Two rings of rollers separated by spacers 72 are provided between hollow shaft 71 and sleeve 9, and gear 64 is connected integral with hollow shaft 71 by a splined coupling.

Figure 8:
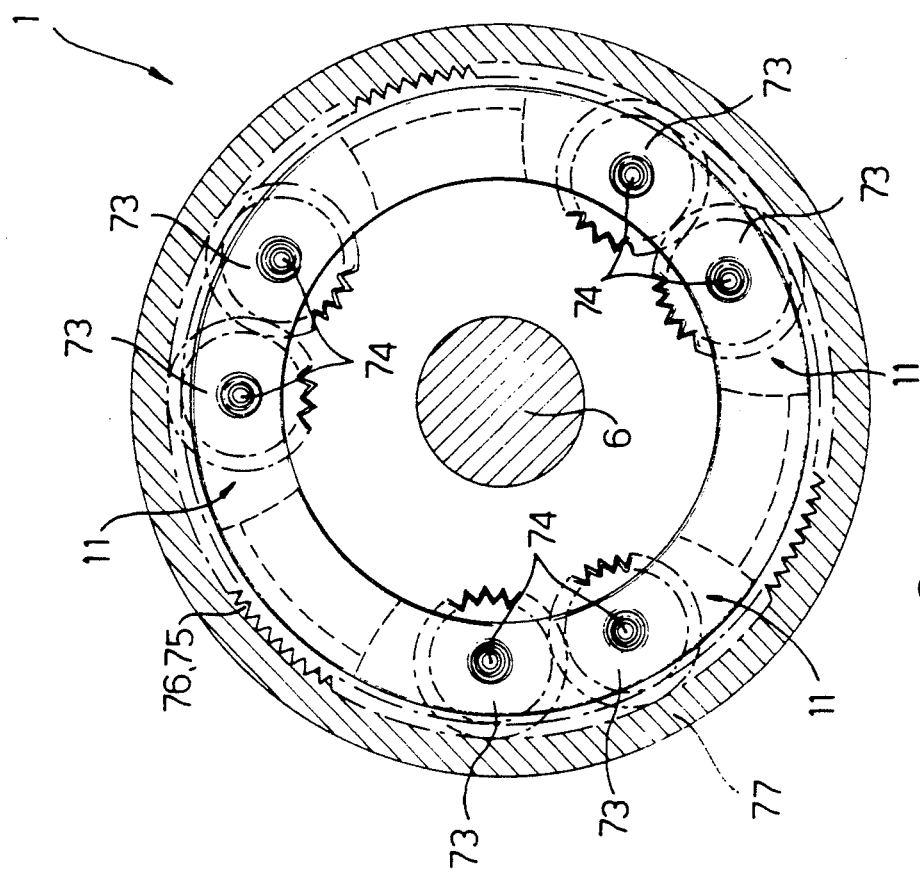
FIGS. 7 and 8 show schematic sections perpendicular to the longitudinal axis of the drive.

Device 11 also comprises at least two planetary gears 73 (FIGS. 4 and 8) rotating on a pin 74 on disk 70, and meshing with each other as shown in FIG. 8, and respectively with internal teeth 75 integral with annular elements 13a, 13b, and internal teeth 76 integral with the housing. Teeth 75 are formed on a ring 77 rotating on the housing and having face teeth 78 meshing with teeth on annular element 13a, for rendering said elements integral with each other. A further face joint 78a (FIG. 4) provides for torsionally connecting annular elements 13a, 13b.

Adjusting device 11 also comprises a further gear 79 (FIG. 4) connected torsionally to housing 15.

Figure 5:
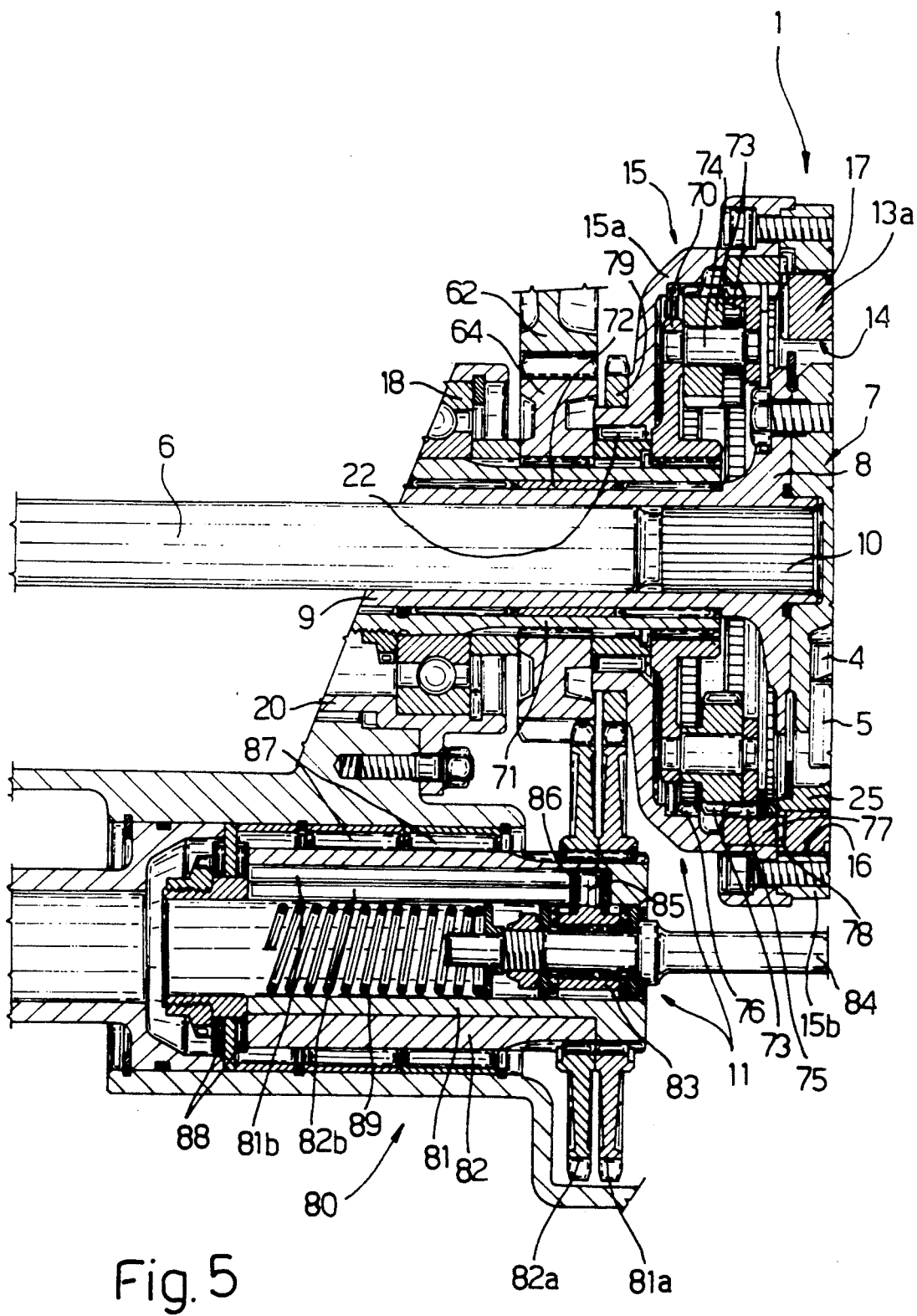
FIG. 5 shows an axial section of another part of the drive illustrating the mechanisms for varying displacement of the pump cylinders in said first group.

As shown in FIG. 4, each cylindrical inner surface 14 of annular element 13a, 13b is eccentric in relation to the outer surface of the rings, which rests on surface 16 of the housing via the interposition of rollers 17. Moreover, the axes of the two side by side surfaces 16 are eccentric, as also shown in FIG. 4. Adjusting device 11 also comprises connecting means indicated as a whole by 80 and shown in detail in FIG. 5, which means provide for adjusting and maintaining a predetermined relative angular position of gears 64 and 79 during rotation of the same. As shown in FIG. 5, means 80 substantially comprise two coaxial sleeves 81, 82 rotating in relation to frame 2 and respectively integral with gears 81a, 82a meshing respectively with gears 79, 64. Sleeves 81, 82 present respective axial grooves 81b, 82b, one of which is not parallel to the longitudinal axis of the sleeves. Connecting means 80 also comprise a bush 83 mounted for rotation in axially-fixed manner on a control rod 84, and having at least a radial pin 85 fitted with a roller 86 designed to fit inside both grooves 81b, 82b, so as to rotate sleeves 81, 82 in relation to each other, when bush 83 moves axially together with control rod 84.

As shown in FIG. 5, both sleeves 81, 82 are supported radially and axially in relation to frame 2 by means of rings of rollers 87 and 88 respectively. Bush 83 is also supported radially and axially on rod 84 by further rollers shown in FIG. 5. Rod 84 is normally maintained in the rightmost position shown in FIG. 5 by a helical spring 89, one end of which rests in a seat 91 (FIG. 4) formed on frame 2.

The drive according to the present invention also comprises hydraulic fluid distributing means (now shown in FIG. 1) for alternately connecting the cylinders of first group 1 with those of second group 28.

Figure 7:
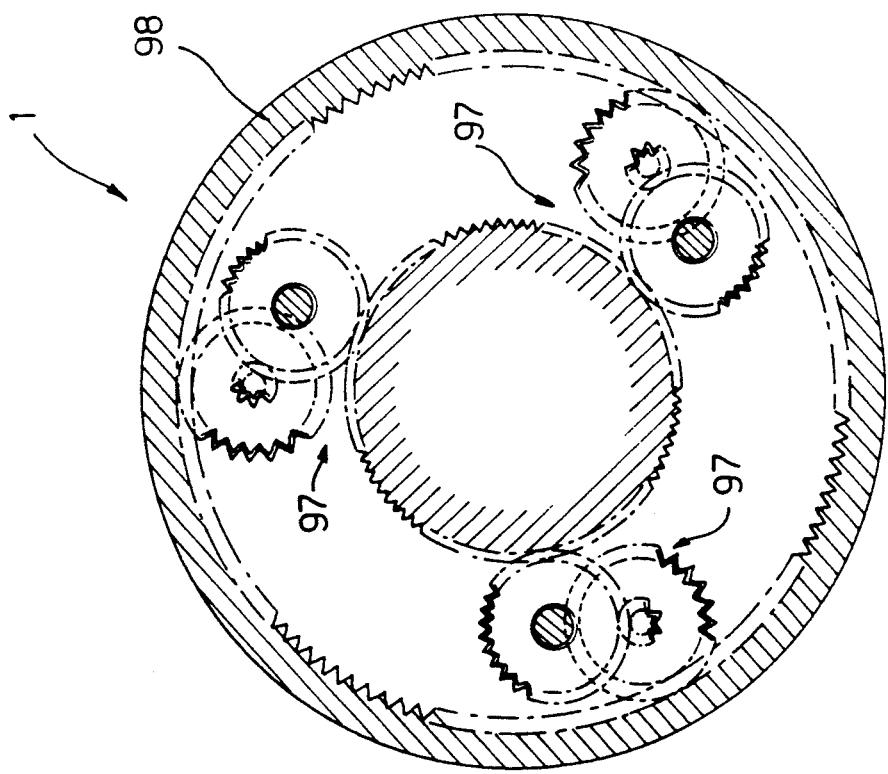

Said distributing means may be of any known type, and, as shown in FIGS. 4 and 6, may conveniently comprise a first ring 95 substantially to the right in FIG. 4, and a further two rings 96 (FIG. 6) at either end of second cylinder group 28. Ring 95 (FIG. 4) presents cavities and distribution surface mating with distribution surfaces on block 7 at which terminate ducks communicating with cavities 4 of first cylinder group 1. Ring 95 is turned substantially about axis $a_1$ by a gear drive indicated as a whole by 97 and shown in FIGS. 4 and 7. Said drive consists of a ring gear 98 integral with annular elements 13a, 13b, and provides for varying the angular position of ring 95 in relation to block 7 of cylinder group 1, when the eccentricity of annular elements 13a, 13b is varied in relation to the housing. Similarly, each ring 96 (FIG. 6), which also presents distribution holes and cavities, rotates in relation to frame 2 by virtue of being connected torsionally to end pin 40 of crank 39 by means of internal teeth and a sprocket 99. Each ring mates with distribution surfaces on housing 38 at which terminate ducts communicating with cavities 30 of cylinder group 28.

Ducts 100 (FIG. 4) are formed inside the component parts of the drive, and are connectable in known manner, by means of piping, to fittings 101 (FIG. 6) terminating in cylinder group 28 and in turn communicating with ducts 51, as shown in FIG. 6.

The drive according to the present invention operates as follows.

When the vehicle engine is idle, annular elements 13a, 13b of cylinder group 1 (FIG. 1) and cam 32 of cylinder group 28 are so positioned as to provide for zero eccentricity of the cylinders in both groups.

The above setting provides for a first or neutral operating mode, wherein the vehicle is free to move with no hydraulic or mechanical restraint on the part of the drive. When cylinder group 1 is set to zero eccentricity, pressurized oil supply for hydraulically powering cylinder group 28 is cut off, whereas the motion transmitted by output shaft 60, as a consequence of the vehicle moving, is fully permitted when cylinder group 28 is also set to zero eccentricity.

In said first operating mode, input shaft 6 rotates cylinder group 1 together with pistons 5, and shoes 25 of piston rods 23 (FIGS. 3 and 4) slide over inner surface 14 of annular elements 13a, 13b with substantially no change in displacement of the cylinders.

A second operating mode is achieved by setting second cylinder group 28 (FIG. 1) to maximum eccentricity, with no change in the zero eccentricity of first group 1, which, on a vehicle with a mechanical transmission, corresponds to depressing the clutch pedal and shifting into first gear.

In the above condition, the transmission is set to drive mode, but is as yet ineffective by virtue of first group 1 being substantially in the same condition described previously wherein oil supply is cut off.

A third operating mode is achieved by varying the eccentricity of annular elements 13a, 13b of first cylinder group 1 between zero and maximum, while maintaining maximum eccentricity of second group 28. A variation in the eccentricity of first group 1, with no change in that of second group 28, provides for a first speed range of output shaft 60 ranging from 0 to a maximum speed $V_1$.

A fourth operating mode, corresponding to a further speed range between $V_1$ and a higher speed $V_2$, is achieved by reducing the eccentricity of second group 28, with no change in that of first group 28, for increasing provides, by virtue of feeding a substantially constant supply of drive fluid to second group 28, for increasing the speed of second group 28 and, consequently, output shaft 60, as the volume swept by each piston, i.e. displacement of group 28, decreases.

Zero eccentricity, which corresponds to zero displacement, of group 28 provides for a fifth operating mode, wherein fluid supply from group 1 to group 28 is cut off. Consequently, input shaft 6, all the members in group 1, and housing 15 rotate integrally together with gear 64, so that the speed of shaft 60 depends solely on the gear ratio of gears 62 and 64, thus providing for direct drive.

The component parts of adjusting device 11 (FIG. 5) for varying the radial position of annular elements 13a, 13b in relation to housing 15 are so mounted that, when said elements are set to zero eccentricity, rollers 85 (FIG. 5) are substantially positioned in the center of grooves 81b, 82b on sleeves 81, 82, which corresponds to a predetermined position of control rod 84.

As of said zero position, the eccentricity of annular elements 13a, 13b is varied by axially displacing control rod 84 in either direction. This results in displacement of bush 83 and rollers 86 on pins 85, which rollers 86, cooperating with the surfaces of grooves 81b, 82b, provide for relative rotation of sleeves 81, 82 and, consequently, gears 81a, 82a. As gears 81a, 82a are respectively integral with gear 79 (in turn integral with housing 15) and gear 64 (integral with disk 70), this provides for relative rotation of housing 15 and disk 70. By virtue of planetary gears 73 meshing with teeth 75 and 76, rotation of housing 15 in relation to disk 70 causes ring 77, and consequently annular elements 13a, 13b connected torsionally to the same, to rotate the opposite way in relation to housing 15. Annular elements 13a, 13b therefore rotate in the opposite direction to housing 15. Relative rotation of annular elements 13a, 13b and housing 15 results in displacement of rollers 17 between elements 13a, 13b and housing 15, thus varying the eccentricity of elements 13a, 13b in relation to axis $a_1$ of shaft 6.

It should be pointed out that adjusting device 11 described above provides for varying the eccentricity of annular elements 13a, 13b even during rotation of gears 79, 64 (respectively integral with housing 15 and disk 70), the rotation of which rotates gears 81a, 82a and, consequently, respective sleeves 81, 82.

Means 34 for varying the eccentricity of cam 32 (FIG. 1) in relation to axis $a_2$ of cylinder group 28 operate as follows.

As of the maximum eccentricity position shown in FIGS. 1 and 6, the eccentricity of cam 32 is varied by simply operating the actuator (not shown) controlling rack 58, which in turn rotates gear 57 and, consequently, crank 39 in relation to frame 2. As axis $a_4$ of crank 39 is eccentric in relation to axis $a_2$ of housing 38, this results in a variation in the eccentricity of cam 32 in relation to housing 38.

The aforementioned operating modes of the drive are possible regardless of the rotation direction of output shaft 60. In fact, when control rod 84 (FIG. 5) is moved in either direction from the center position (corresponding to zero eccentricity of annular elements 13a, 13b of cylinder group 1), the eccentricity of elements 13a, 13b is varied according to a predetermined sign, which is inverted when rod 84 is moved in the opposite direction. Obviously, when switching from one to the other of the above configurations, the hydraulic cylinders in group 1 switch from delivery to intake, and the rotation direction of cam 32 and output shaft 60 is inverted.

The distribution means described briefly above, and whereby the cylinders in group 1 are alternately connected to those of group 28, operate in known manner. To those skilled in the art it will be clear that changes may be made to both the design and arrangement of the component parts of the embodiment described and illustrated herein without, however, departing from the scope of the present invention.

We claim:

1. A hydrostatic, two-way-variable-speed drive, characterised by the fact that it comprises:

a first group of cylinders (1) of a radial hydraulic pump, rotating about a first axis ($a_1$) in relation to the drive frame (2); each said cylinder comprising at least a hollow body (3) defining a radial cavity (4) open on the radially-outermost side of said body (3), and a piston (5) moving axially inside said cavity (4); said first group of cylinders (1) being torsionally integral with the input shaft (6) of the drive;

at least one annular element (13a, 13b) arranged peripherally about the cylinders in said first group (1), and having a substantially cylindrical inner surface (14) cooperating with the radially-outermost end of said pistons (5) in said first group of cylinders (1), for controlling reciprocating movement of said pistons (5) in relation to said hollow bodies (3) as said first group of cylinders (1) rotates in relation to said annular element (13a, 13b); said annular element (13a, 13b) being secured in radially-adjustable manner to a first housing (15) rotating in relation to said input shaft (6);

an adjusting device (11) for varying the radial position of said annular element (13a, 13b) in relation to said housing (15), for varying the eccentricity of said inner surface (14) of said annular element (13a, 13b) in relation to said first axis ($a_1$) of said first group of cylinders (1);

a second group of cylinders (28) of a radial hydraulic motor, rotating about a second axis ($a_2$) in relation to said frame (2); each said cylinder comprising at least a hollow body (29) defining a radial cavity (30) open on the radially-innermost side of said body (29), and a piston (31) moving axially inside said cavity (30);

at least a cam (32) located in a radially-inner position in relation to the cylinders in said second group (28), and having an outer surface (33) cooperating with the radially-innermost ends of said pistons (31) in said second group of cylinders (28), for enabling reciprocating movement of said pistons (31) in relation to said hollow bodies (29) when said cylinders in said second group (28) are supplied with pressurized oil by said first group of cylinders (1); said cam (32) being supported on said frame (2);

adjusting means (34) for varying the radial position of said cam (32) in relation to said frame (2), for varying the eccentricity of said cam (32) in relation to said second axis ($a_2$) of said second group of cylinders (28);

an output shaft (60) of the drive, rotating in relation to said frame (2) about a third axis ($a_3$) located between said first axis ($a_1$) of said first group of cylinders (1) and said second axis ($a_2$) of said second group of cylinders (28); said output shaft (60) being integral with a first gear (62) meshing with a second gear (63) integral with said second group of cylinders (28) and with a third gear (64) integral with said first housing (15), so that rotation of said first housing (15) about said first axis ($a_1$) rotates said output shaft (60) and said second group of cylinders (28) about said second axis ($a_2$); and hydraulic fluid distributing means for alternately connecting said cylinders in said first group (1) with said cylinders in said second group (28).

2. A drive as claimed in claim 1, characterised by the fact that said adjusting device (11) for varying the radial position of said annular element (13a, 13b) in relation to said first housing (15) comprises:

an inner cylindrical surface (16) of said first housing (15) enabling rotation of the outer surface of said annular element (13a, 13b) in relation to said housing (15), said inner surface (14) of said annular element (13a, 13b) being eccentric in relation to said outer surface;

a disk (70) located inside said first housing (15) and integral with a hollow shaft (71) coaxial with said input shaft (6) and fitted with said third gear (64);

two planetary gears (73) rotating on a pin (74) on said disk (70) and meshing both mutually and respectively with internal teeth (75) integral with said annular element (13a, 13b) and with internal teeth (76) integral with said first housing (15), so as to torsionally connect said disk (70) with said housing (15) and said annular element (13a, 13b);

a fourth gear (79) coaxial with said third gear (64) and connected to said first housing (15); and connecting means (80) for varying the relative angular position and maintaining a predetermined relative angular position of said third (64) and said fourth (79) gears during rotation of the same.

3. A drive as claimed in claim 2, characterised by the fact that said connecting means (80) comprise:

two coaxial sleeve (81, 82) rotating in relation to said frame (2) and each integral with a respective gear (81a, 82a) meshing respectively with said fourth gear (79) and said third gear (64), each said sleeve (81, 82) presenting an axial groove (81b, 82b), one of which is not parallel to the sleeve axis; and a bush (83) mounted for rotation on and fixed axially in relation to a control rod (84), said bush (83) presenting at least a radial pin (85) having a roller (86) designed to fit inside said grooves (81b, 82b) for rotating one sleeve in relation to the other when said bush (83) moves axially together with said control rod (84).

4. A drive as claimed in claim 2, characterised by the fact that a ring of rollers (17) is inserted between said annular element (13a, 13b) and said inner surface (16) of said first housing (15); said internal teeth (75) integral with said annular element (13a, 13b) being formed on a ring (77) rotating in a seat on said housing, located to the side of said annular element (13a, 13b) and connected to the same by means of a face joint (78).

5. A drive as claimed in claim 1, characterised by the fact that said first group of cylinders (1) comprises two sets of cylinders having their axes in two parallel planes; the cylinders in one set being offset in relation to those in the other set; and each said set having a respective said annular element (13a, 13b) connected torsionally to each other by means of a face joint (78a).

6. A drive as claimed in claim 1, characterised by the fact that said radially-outermost end of each said piston (5) in said first group of cylinders (1) presents a shoe (25) hinged to said piston (5) and sliding over said inner surface (14) of said annular element (13a, 13b).

7. A drive as claimed in claim 1, characterised by the fact that it comprises:

a second housing (38) rotating on said frame (2) about said second axis (a₂), supporting said cylinders in said second group (28), and fitted with said second gear (63);

a crank (39) having end pins (40) between which said cam (32) is formed, said pins (40) rotating in relation to said second housing (38) about a fourth axis (a₄) eccentric in relation to said second axis (a₂); and adjusting means (34) for varying and maintaining a predetermined angular position of said crank (39) in relation to said frame (2).

8. A drive as claimed in claim 7, characterised by the fact that said means (34) for varying the angular position of said crank (39) comprise a sprocket (57) integral with one of said pins (40), and a rack (58) meshing with said sprocket (57) and controlled by an actuator.

9. A drive as claimed in claim 7, characterised by the fact that each said cylinder in said second group (28) comprises a cup-shaped body (29) in which said cavity (30) is formed, and the bottom wall of which rests on a wall of said second housing (38); and a second cup-shaped body mating in sliding manner with said first body (29) and forming one of said pistons (31) in said second group (28); the bottom wall of each said second cup-shaped body resting on said outer surface (33) of said cam (32).

10. A drive as claimed in claim 9, characterised by the fact that, between said cam (32) and said bottom wall of said second cup-shaped bodies, there is inserted a bush (49) rotating on said cam (32) by means of rollers (50).

11. A drive as claimed in claim 1, characterised by the fact that said hydraulic fluid distributing means comprise:

a first distribution ring (95) having distribution holes and cavities, and coaxial with the axis (a₁) of a block (7) of said first group of cylinders (1); said first distribution ring (95) having distribution surface mating with respective distribution surfaces on said block (7) at which terminate ducts communicating with said cavities (4) of said first group of cylinders (1); said distribution ring (95) being rotated about said first axis (a₁) by a first gear drive (97) controlled by the relative rotation of said first housing (15) in relation to said disk (70); and at least a second distribution ring (96) having distribution holes and cavities, and coaxial with the axis (a₂) of said second housing (38); said second distribution ring (96) having distribution surfaces mating with distribution surface on said second housing (38) at which terminate ducts communicating with said cavities (30) of said second group of cylinders (28); said second distribution ring (96) being rotated about said second axis (a₂) by a second gear drive (99) controlled by the relative rotation of said crank (39) in relation to said frame (2).

* * * * *